United States Patent
Bai et al.

(10) Patent No.: US 9,513,886 B2
(45) Date of Patent: Dec. 6, 2016

(54) HEAP DATA MANAGEMENT FOR LIMITED LOCAL MEMORY(LLM) MULTI-CORE PROCESSORS

(71) Applicants: Ke Bai, Tempe, AZ (US); Aviral Shrivastava, Chandler, AZ (US)

(72) Inventors: Ke Bai, Tempe, AZ (US); Aviral Shrivastava, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 465 days.

(21) Appl. No.: 14/166,220

(22) Filed: Jan. 28, 2014

(65) Prior Publication Data

US 2014/0215192 A1 Jul. 31, 2014

Related U.S. Application Data

(60) Provisional application No. 61/757,272, filed on Jan. 28, 2013.

(51) Int. Cl.
*G06F 12/00* (2006.01)
*G06F 9/45* (2006.01)
*G06F 12/08* (2016.01)

(52) U.S. Cl.
CPC ......... *G06F 8/4442* (2013.01); *G06F 12/0862* (2013.01)

(58) Field of Classification Search
CPC .............................. G06F 8/4442; G06F 12/0862
See application file for complete search history.

(56) References Cited

U.S. PATENT DOCUMENTS

| 6,799,253 B1 | 9/2004 | Peterson |
| 6,876,561 B2 | 4/2005 | Wolrich et al. |
| 7,367,024 B2 | 4/2008 | Barua et al. |
| 7,996,630 B2 | 8/2011 | Yim et al. |

(Continued)

FOREIGN PATENT DOCUMENTS

WO  2010/142432  6/2010

OTHER PUBLICATIONS

Bai, K. et al., "Vector Class on Limited Local Memory (LLM) Multi-core Processors", Proceedings of the 14th International Conference on Compilers, Architectures and Synthesis for Embedded Systems (CASES), Oct. 2011, pp. 215-224.

(Continued)

*Primary Examiner* — Zachary K Huson
(74) *Attorney, Agent, or Firm* — Norton Rose Fulbright US LLP

(57) ABSTRACT

A compiler tool-chain may automatically compile an application to execute on a limited local memory (LLM) multi-core processor by including automated heap management transparently to the application. Management of the heap in the LLM for the application may include identifying access attempts to a program variable, transferring the program variable to the LLM, when not already present in the LLM, and returning a local address for the program variable to the application. The application then accesses the program variable using the local address transparently without knowledge about data in the LLM. Thus, the application may execute on a LLM multi-core processor as if the LLM multi-core processor has an unlimited heap space.

13 Claims, 9 Drawing Sheets

(56) References Cited

U.S. PATENT DOCUMENTS

| | | | |
|---|---|---|---|
| 2010/0023700 A1* | 1/2010 | Chen | G06F 8/4442 711/135 |
| 2012/0137075 A1 | 5/2012 | Vorbach | |
| 2012/0222005 A1 | 8/2012 | Harris et al. | |

OTHER PUBLICATIONS

Bai, K. et al., "Stack Data Management for Limited Local Memory (LLM) Multi-core Processors", IEEE International Conference in Application-Specific Systems, Architectures and Processors (ASAP), Sep. 2011, pp. 231-234.

Bai, K. et al., "Heap Data Management for Limited Local Memory (LLM) Multi-core Processors", IEEE/ACM/IFIP International Conference on Hardware/Software Codesign and System Synthesis (CODES+ISSS), Oct. 2010, pp. 317-325.

Jung, S.C. et al., "Dynamic Code Mapping for Limited Local Memory Systems", 21st IEEE International Conference in Application-Specific Systems, Architectures and Processors (ASAP), Jul. 2010, pp. 13-20.

Bai, K. et al., "Automatic and Efficient Heap Data Management for Limited Local Memory Multicore Architectures", Proceedings of the Conference on Design, Automation and Test in Europe (DATE 2013), Mar. 2013, pp. 593-598.

Lu, J. et al., "SSDM: Smart Stack Data Management for Software Managed Multicores (SMMs)", 50th ACM/EDAC/IEEE Design Automation Conference, May 2013, pp. 1-8.

Angiolini, F. et al., "A Post-Compiler Approach to Scratchpad Mapping of Code", In Compilers, architecture, and synthesis for embedded systems, pp. 259-267, New York, NY, USA, 2004. ACM Press.

Avissar, O. et al., "An Optimal Memory Allocation Scheme for Scratch-Pad-Based Embedded Systems", ACM Trans. on Embedded Computing Sys., 1(1):6-26, 2002.

Balart, J. et al., "A Novel Asynchronous Software Cache Implementation for the Cell-BE Processor", LCPC 2007, LNCS 5234, pp. 125-140, 2008.

Banakar, R. et al., "Scratchpad Memory : A Design Alternative for Cache On-chip memory in Embedded Systems",In CODES'02:Hardware/software codesign, pp. 73-78, New York, NY, USA, 2002. ACM Press.

Dominguez, A. et al., "Heap Data Allocation to Scratch-Pad Memory 1 in Embedded Systems", Embedded Computing, 1(4):521-540, 2005.

Egger, B. et al., "Scratchpad Memory Management for Portable Systems with a Memory Management Unit", in EMSOFT '06: Proceedings of the 6th ACM & IEEE International conference on Embedded software, pp. 321-330, New York, NY, USA, 2006. ACM.

Egger, B. et al., "A Dynamic Code Placement Technique for Scratchpad Memory Using Postpass Optimization", In CASES '06: Proceedings of the 2006 international conference on Compilers, architecture and synthesis for embedded systems, pp. 223-233, New York, NY, USA, 2006. ACM.

Eichenbereger, A.E. et al., "Using advanced compiler technology to exploit the performance of the Cell Broadband Engine architecture", IBM Syst. J., 45(1):59-84, 2006.

Flachs, B. et al., "The microarchitecture of the synergistic processor for a cell processor", IEEE Solid-state circuits, 41(1):63-70, 2006.

Francesco, P. et al., "An Integrated Hardware/Software Approach for Run-Time Scratchpad Management", n Proc. DAC, 2004, pp. 238-243.

Guthaus, M.R. et al., "MiBench: A free, commercially representative embedded benchmark suite", WWC-4: IEEE International Workshop on Workload Characterization, pp. 3-14, Dec. 2, 2001.

Janapsatya, A. et al., "A novel instruction scratchpad memory optimization method based on concomitance metric", In ASP-DAC '06: Proceedings of the 2006 conference on Asia South Pacific design automation, pp. 612-617, Piscataway, NJ, USA, 2006. IEEE Press.

Johns, C.R. et al., "Introduction to the Cell Broadband Engine Architecture", IBM J. Res. Dev., vol. 51, No. 5, pp. 503-519, 2007.

Kandemir, M. et al., "Compiler-Directed Scratch Pad Memory Hierarchy Design and Management", in DAC '02: Proceedings of the 39th annual Design Automation Conference. New York, NY, USA: ACM, 2002, pp. 628-633.

Kandemir, M. et al., "Exploiting Shared Scratch Pad Memory Space in Embedded Multiprocessor Systems", In DAC, pp. 219-224, 2002.

Kandemir, M. et al., "Dynamic Management of Scratch-Pad Memory Space", In DAC, pp. 690-695, 2001.

Kannan, A. et al., "A software solution for dynamic stack management on scratch pad memory", In ASP-DAC '09: Proceedings of the 2009 Conference on Asia and South Pacific Design Automation, pp. 612-617, Piscataway, NJ, USA, 2009. IEEE Press.

Kim, Y. et al., "Operation and Data Mapping for CGRAs with Multi-bank Memory" in LCTES'10, Apr. 13-15, 2010, Stockholm, Sweden., p. 17-25.

Kistler, M. et al., "Cell Multiprocessor Communication Network: Built for Speed", IEEE Micro, May-Jun. 2006.

Li, L. et a., "Compiler-Directed Scratchpad Memory Management via Graph Coloring", ACM Trans. Archit. Code Optim., vol. 6, No. 3, pp. 1-17, 2009.

Li, L. et al., "Memory Coloring: A Compiler Approach for Scratchpad Memory Management", In Proceedings of the 14th International Conference on Parallel Architectures and Compilation Techniques (PACT'05), pp. 329-338, Sep. 2005.

Mamidipaka, M. et al., "On-chip Stack based Memory Organization for Low Power Embedded Architectures", In Proc DATE, pp. 1082-1087, 2003.

McIlroy, R. et al., "Efficient Dynamic Heap Allocation of Scratch-Pad Memory", In ISMM'08, pp. 31-40, 2008.

Muck, T. R. et al., "Run-time Scratch-pad Memory Management for Embedded Systems", In Proc. IECON 2011—37th Annual conference on IEEE Industrial Electronics Society, pp. 2833-2938, 2011.

Nguyen, N. et al., "Memory Allocation for Embedded Systems with a Compile-Time-Unknown Scratch-Pad Size", In CASES, pp. 115-125, 2005.

Pabalkar, A. et al., SDRM: Simultaneous Determination of Regions and Function-to-Region Mapping for Scratchpad Memories, in Int'l Conference on High Performance Computing (HiPC), Dec. 2008.

Panda, P.R. et al., "On-Chip vs. Off-Chip Memory: The Data Partitioning Problem in Embedded Processor-Based Systems", ACM Transactions on Design Automation of Electronic Systems, vol. 5, No. 3, pp. 682-704, 2000.

Park, S. et al., "Novel Technique to Use Scratch-pad Memory for Stack Management", In Proc DATE pp. 1478-1483, 2007.

Shrivastava, A. et al., "A Software-Only Solution to Use Scratch Pads for Stack Data", IEEE Transactions on Computer-Aided Design of Integrated Circuits and Systems, vol. 28, No. 11, pp. 1719-1727, 2009.

Smith, J.E., "A Study of Branch Prediction Strategies", In Proc of ISCA, pp. 135-148, 1981.

Steinke, S. et al., "Reducing Energy Consumption by Dynamic Copying of Instructions onto Onchip Memory", onchip memory. In ISSS '02: Proceedings of the 15th international symposium on System Synthesis, pp. 213-218, New York, NY, USA, 2002. ACM.

Steinke, S. et al., "Assigning Program and Data Objects to Scratchpad for Energy Reduction", In Proc Design, automation and test in Europe (DATE), p. 409, 2002.

Udayakumaran, S. et al., "Dynamic Allocation for Scratch-Pad Memory using Compile-Time Decisions", Trans. on Embedded Computing Sys., 5(2):472-511, 2006.

Verma, M. et al., "Overlay Techniques for Scratchpad Memories in Low Power Embedded Processors", Very Large Scale Integration (VLSI) Systems, IEEE Transactions on, 14(8):802-815, Aug. 2006.

Verma, M. et al., "Scratchpad Sharing Strategies for Multiprocess Embedded Systems: A First Approach", In ESTImedia, pp. 115-120, 2005.

(56) References Cited

OTHER PUBLICATIONS

Verma, M. et al., "Cache-Aware Scratchpad Allocation Algorithm", In Proc Design, automation and test in Europe—vol. 2 (DATE'04), p. 21264, 2004.

* cited by examiner

```
main(){
  for(speID=0;speID<NUM_SPEs;speID++){
    init_SPEs(speID);
  }
}
                    (a) PPE code
```

```
typedef struct{
  int id;
  float price;
} ITEM;

main(){
  for(i=0;i<N;i++){
    item[i] = malloc(sizeof(ITEM));
    item[i].id = i;
    printf("%d\n", item[i].id);
  }
}
                    (b) SPE code
```

FIG. 2
PRIOR ART

```
heapManage(){
  while(1){
    spe_out_mbox_read(speID,size...);
    ppeAddr = malloc(size);
    spe_in_mbox_write(speID,&ppeAddr
        ...);
  }
}
main(){
  for(speID=0;speID<6;speID++){
    init_SPEs(speID);
  }
  /* Create a new thread */
  pthread_create(..&heapManage..);
}

(a) PPE code
```

```
#define CACHENAME HEAP
        ...
typedef struct{
  int id;
  float price;
}Item;

main(){
  for (i=0;i<N;i++){
    spu_write_out_mbox(sizeof(Item));
    item[i] = spu_read_in_mbox();
    cache_wr(HEAP,item[i].id,i);
    printf("%d\n",cache_rd(HEAP,item[
        i].id));
  }
}

(b) SPE code
```

FIG. 3
PRIOR ART

```
Input: Basic block set B, statement list S in GIMPLE
       IR
Output: GIMPLE IR with the insertion of _g21

1 foreach basic block bb ∈ B do
2     foreach statement s ∈ S_i, such that block statement
      list S_i is for bb, and S_i ⊂ S, ∪ S_i = S do 3         if s contains multi-level pointers then
4             break down to single level pointers with
              artificial variables, transform s to statements
              with only single level pointers 5 foreach basic block bb ∈ B do
6     foreach satement s ∈ S_i, such that block statement
      list S_i, is for bb, and S_i ⊂ S, ∪ S_i = S do
7         if s is a modification expression then
8             analyzeStmt(s)

9 Function analyzeStmt(stmt)
10 l ← getLeftOperand(stmt); r ← getRightOperand(stmt)
   /* T is a single level ptr with the
      same type as the ptr in the stmt,
      and it is created by the compiler            */
11 if TREE_CODE(r) is a reference then
12     create statement "T = _g21(r)"
13     substitute r with T in stmt 14 else if TREE_CODE(l) is a reference then
15     create statement "T = _g21(l)"
16     substitute l with T in stmt 17 insert new statement into statement list right before stmt
```

FIG. 8

HEAP DATA MANAGEMENT FOR LIMITED LOCAL MEMORY(LLM) MULTI-CORE PROCESSORS

CROSS-REFERENCE TO RELATED APPLICATIONS

This application claims the benefit of priority of U.S. Provisional Application No. 61/757,272 to Ke Bai et al. filed on Jan. 28, 2013 and entitled "Heap Data Management for Limited Local Memory (LLM) Multi-Core Processors," which is hereby incorporated by reference.

STATEMENT OF GOVERNMENTAL SUPPORT

This invention was made with government support under 0916652 awarded by the National Science Foundation. The government has certain rights in the invention.

FIELD OF THE DISCLOSURE

The instant disclosure relates to data management. More specifically, this disclosure relates to data management for multi-core processors.

BACKGROUND

Processors are now transitioning from multi-core (e.g., few cores) to many-core (e.g., hundreds of cores). In particular, many-core processors are finding specialized applications where processing on large chunks of data can be carried out in a massively parallel configuration. Scaling a memory architecture to accommodate many-core processing systems can be challenging. Further, maintaining an appearance of a single unified memory architecture, when multiple memory subsystems are involved, may be expensive. One problem that contributes to the expense is that the power and performance overheads of automatic memory management in hardware, such as caches, is becoming prohibitive. Caches consume about half of the processor energy on a single-core processor and consume an even larger fraction in multi-core and many-core processors. Another problem that contributes to the expense is that cache coherency protocols do not scale well to hundreds and thousands of cores.

One conventional solution to improve memory systems in many-core processing systems is the use of limited local memory (LLM) architectures. FIG. 1 is a block diagram illustrating a conventional limited local memory (LLM) architecture. One example of an LLM architecture, such as shown in FIG. 1, is the IBM Cell Broadband Engine. An LLM architecture 100 may include a 9-core processor, with one main core 112 (the Power Processing Element or PPE) and eight execution cores 102 (the Synergistic Processing Elements or SPEs). The main core 112 in the cell processor may be a two-way simultaneous multi-threaded core, and each of the execution cores 102 may work on only one thread at a time in a non-pre-emptive fashion. The main core 112 may execute the operating system, and the main core 112 may have direct access to the global memory through a coherent L2 cache, while each execution core 102 may have a local store memory 106 having, for example, 256 KB of available space. Data communications between the local memory on the execution core and the global memory may be explicitly managed in the software through direct memory access (DMA) engine 108. The DMA engine 108 may have access to an interconnect bus with a 128-byte width, up to or more than 300 GB/s capacity, and/or have a 100-deep request queue.

In an LLM architecture, each core of a many-core processor has a small local memory. Each core has access to only the small memory, but transfers between local and global memory have to be explicitly specified in the application code. The explicit transfer requirement presents challenges to developing application for many-core processors with LLM. One challenge is for applications to be rewritten in a parallelized fashion to operate on the many-core processor. A second challenge is to efficiently execute the application in a threaded manner with the limited memory. The application, and the data accessed by the application, is stored in and executed within the limited memory available. Heap data, in particular, is dynamic in nature and may not be known at compile time, increasing the difficulty of writing application for the limited memory. Heap data may overwrite stack data inadvertently during execution and cause program failures, such as an application crash, entering an infinite loop, or generating an incorrect result.

Programming on an LLM architecture, such as shown in FIG. 1, may be based on a message passing interface (MPI)-style thread model. A main controller thread creates and distributes data and tasks, and may also collect results from the execution threads. The main thread runs on the main core, while the execution threads are scheduled on the execution cores. A very simple application in this multicore programming paradigm is illustrated in FIG. 2. FIG. 2 is pseudocode for programming an LLM architecture, such as FIG. 1. In the pseudocode, the main thread, executing on the main core, initiates several execution threads on the execution cores. In the execution core, thread student data structures are initialized and operated on. The student data structure contains two fields, id (int) and score (float), for each student.

Normally, the local memory on the execution core is divided into three segments by the software: the text region (program code and data), heap variable region, and stack variable region. The text region is where the compiled code of the program itself resides. The function frames reside in the stack space, which starts from the top of the memory, growing downwards, while the heap variables (defined through a malloc command) are allocated in the heap region starting from the top of the code region and growing upwards. The three segments share the local store, and because the local store is a constrained resource and lacks any hardware protection, heap data can easily overflow into the stack region and corrupt the program state.

In the pseudocode of FIG. 2, for small values of N, the program will execute fine, but large values of N may cause catastrophic failures. However, even worse is when output is just subtly incorrect. One way to avoid these problems, is to avoid using heap variables. However, this approach is very limiting on both the creativity and productivity of the programmer.

One conventional method of managing heap data in local memory in an LLM processor is through the use of software cache. FIG. 3 is source code illustrating managing heap data of an application, such as shown in FIG. 2, through a software cache. A software cache is a semi-automatic way to manage large amounts of data in a constant amount of local memory space. A software cache data structure may be located in the execution core with a predetermined size in the global data segment. To use software cache, an application may include a declaration to manage certain data structure through software cache and the application may then replace every access of that data by a read/write from the software cache. Software cache access first checks whether the data is in the cache data structure on the local memory or not. If it is, then the program can directly read/write the data from/to the cache, otherwise, a direct memory access (DMA), is performed to retrieve the required data from the global memory and store the data in the local memory, where it can be accessed. As new data comes in the cache data structure, older data may be evicted out to the main memory.

FIG. 3 gives an example of how the heap data of the application described in FIG. 2 may be managed through software cache. The first line of FIG. 3B shows the declaration of the software cache named HEAP. Because the number of students is unknown and can be large, the student data structures must be allocated in the global memory. However, in the original code, the student data structures are malloc-ed in the execution thread. Therefore, there is a need to communicate memory requirements from the execution threads/cores to the main thread/core. This requires a change in the structure of the multi-threaded program.

In the example shown in FIG. 3, the execution thread/core (SPE) sends the size of malloc to the main thread/core (PPE) through a mailbox. The main thread/core (PPE) allocates space for the student data structure in the global memory and sends its address back to the execution thread/core (SPE). The execution core (SPE) uses this address to access the student data structure that actually resides in the global memory, through software cache. To enable this scheme, a new thread on the main core (PPE), heapManage, may be initiated, which waits for requests from the execution thread/core (SPE), allocates the requested data structure in global memory heap, and sends back the allocated address to the execution thread/core (SPE). Similar steps are taken when free-ing up the allocated memory, but are skipped for simplicity in the example.

One complexity with the software caching of heap data is that the interface of the software cache requires that the data should be allocated on main core, and the execution cores must access the data using the global address. To use software cache, if an execution thread/core allocates/frees certain variables (using malloc/free), then these allocation requests must be transmitted to the main core. Users have to program this communication and allocation/free manually. In addition, to enable that main core handle the execution thread memory management requests, users have to manually create a new thread, which will wait and serve requests from execution threads. Normally the execution cores do the bidding of the main core, but to support this heap management the main core serves the execution core requests. This reversal of roles makes this programming non-intuitive and complicated.

A second complexity with software caching of heap data is that the software cache library only supports one data type in a cache. Software cache does not support, for example, both an integer element and a pointer element, and it must be renamed as any other non-structure and non-pointer data type. This has to be done because the weight is int, and should be changed to integer for the purpose that the two element can use one cache instead of two different caches. This is un-natural for C programming and severely reduces readability.

A third complexity with software caching of heap data is that even if the data is in the cache, we still need to use cache functions cache_rd and cache_wr to access data from software cache. The programmer cannot avoid looking up and therefore there is little scope for optimization on the management overhead.

Software cache is best suited to handling global data, which is declared and allocated once. Because heap data is allocated dynamically, software caching of heap data is inefficient. Software caching of heap data would require changes in application coding and changing the thread on the main core of the many-core processor system. Further, software caching is difficult to implement and debug as the number of processors increases. What is needed is a scheme that limited local memory (LLM) multi-core programmers and applications can use to efficiently and intuitively manage heap memory of the application.

SUMMARY

Heap data management may be handled to reduce complexity to the programmer, reduce complexity in the application, and/or to improve performance of the application. In one embodiment, the additional complexity in managing heap memory in a limited space on the local memory may be concealed in a library, to minimize changes in the application written for the LLM architecture. For example, programmers do not need to worry about the data type for their heap variables. In certain embodiments, a user may not write an extra thread on the main core (e.g., PPE on the IBM Cell processor) for heap data management. In fact, the main thread may not change at all. Programmers do not need to consider the redistribution of heap data. The programmers can continue to program as if each execution core has enough memory to manage nearly unlimited heap data. In one embodiment, a program may include the functions p2s and s2p before and after any access to a heap variable to allow access to the heap. These modifications are a subset of managing heap data through a software cache, do not change the structure of a multi-threaded program, and are easy for the programmer. Through these functions, the global address and local address may be exposed to programmers.

In another embodiment, a compiler may automatically insert the library calls without additional coding in the program. The heap management may be built into compiler tool-chains to remove programming overhead when compiling applications for limited local memory (LLM) processors. Further, the compiler may perform analysis to provide hints to programmers implementing efficient code for the respective target architecture.

According to one embodiment, a method includes executing an application on an execution processor having access to a limited local memory. The method also includes managing heap data in the limited local memory. The step of managing may include receiving an access attempt to a program variable at a global address, loading the program variable at the global address in a global memory to the limited local memory, and returning a local address for the program variable to the application.

According to another embodiment, a computer program product includes a non-transitory computer readable medium comprising code to execute the steps comprising executing an application on an execution processor having access to a limited local memory and managing heap data in the limited local memory. Managing the heap data may include the steps of receiving an access attempt to a program variable at a global address, loading the program variable at the global address in a global memory to the limited local memory, and returning a local address for the program variable to the application.

According to yet another embodiment, an apparatus may include a local limited memory, a global memory, and a processor coupled to the local limited memory and to the global memory. The processor is configured to execute the steps comprising executing an application on an execution processor having access to a limited local memory and managing heap data in the limited local memory. Managing the heap data may include receiving an access attempt to a program variable at a global address, loading the program variable at the global address in a global memory to the limited local memory, and returning a local address for the program variable to the application.

According to one embodiment, a method may include traversing a plurality of statements in a basic block of an application; determining whether a statement of the plurality of statements includes a memory reference; and, when the statement includes a memory references, inserting a translation statement before the statement.

According to another embodiment, a computer program product may include a non-transitory computer readable medium having code to execute certain steps. The steps may include traversing a plurality of statements in a basic block of an application; determining whether a statement of the plurality of statements includes a memory reference; and, when the statement includes a memory references, inserting a translation statement before the statement.

According to yet another embodiment, an apparatus may include a memory and a processor coupled to the memory. The processor may be configured to execute certain steps including traversing a plurality of statements in a basic block of an application; determining whether a statement of the plurality of statements includes a memory reference; and, when the statement includes a memory references, inserting a translation statement before the statement.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIG. 2 is source code for programming an LLM architecture, such as FIG. 1.

FIG. 3 is source code illustrating managing heap data of an application, such as shown in FIG. 2, through a software cache.

FIG. 8 is source code illustrating insertion of heap data management statements during compilation of a program according to one embodiment of the disclosure.

DETAILED DESCRIPTION

Figure 1:
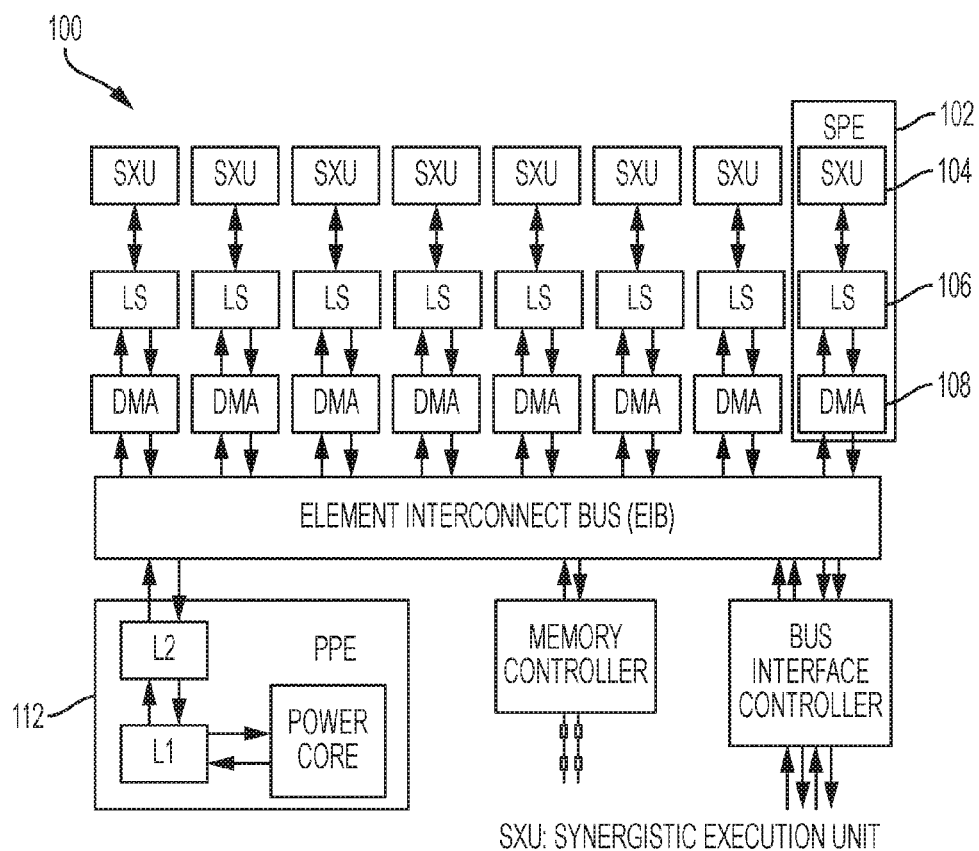
FIG. 1 is a block diagram illustrating a conventional limited local memory (LLM) architecture.
Figure 4:
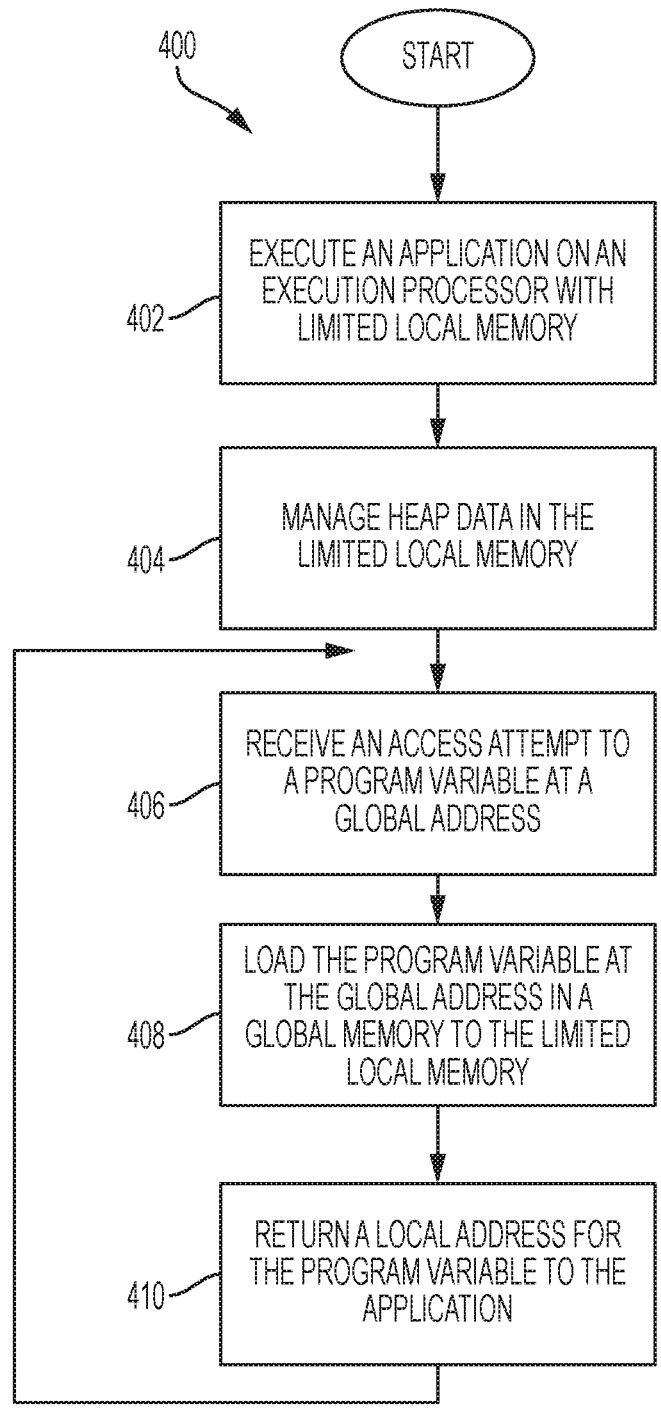
FIG. 4 is a flow chart illustrating heap memory management according to one embodiment of the disclosure.

FIG. 4 is a flow chart illustrating heap memory management according to one embodiment of the disclosure. A method 400 begins at block 402 with executing an application on an execution processor with limited local memory, such as in the architecture of FIG. 1. At block 404, the heap data in the limited local memory is managed. The heap data management may include receiving an access attempt to a program variable at a global address at block 406, loading the program variable at the global address in a global memory to the limited local memory at block 408, and returning a local address for the program variable to the application at block 410.

Figures 5, 6:
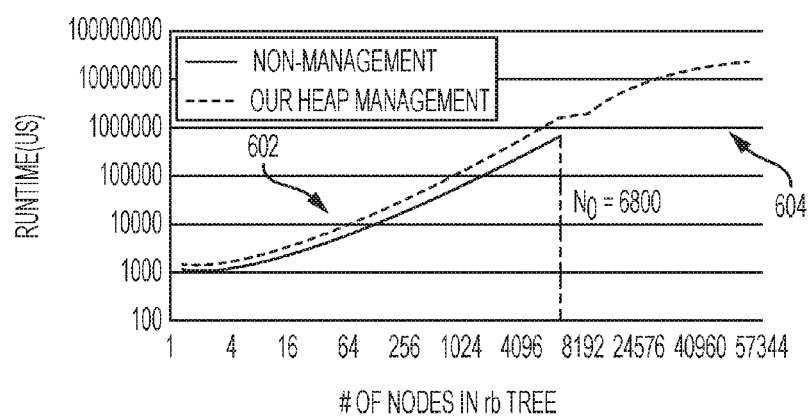
FIG. 5 is source code illustrating an approach to manage heap data according to one embodiment of the disclosure.
FIG. 6 is a graph illustrating heap size capabilities with and without heap management according to embodiments of the disclosure.

The steps of blocks 406, 408, and 410 may be hidden in a library accessible by the application. Thus, programmers do not need to worry about the data type for their heap variables. FIG. 5 is source code illustrating an approach to manage heap data according to one embodiment of the disclosure. In one embodiment, the heap may be declared and allocated/free-ed on the execution thread/core (SPE). Thus, a separate thread on the main core (PPE) for heap data management may be avoided and there may be little or no change to the main core thread to support the heap data management. Programmers may minimize consideration or avoid consideration of the redistribution of heap data, such that the applications may continue to execute as if each execution core has enough memory to manage a nearly unlimited heap data. The application may include the functions p2s and s2p before and/or after any access to a heap variable. These modifications may be a subset of functions for managing heap data through software cache, do not change the structure of a multi-threaded program, and are easy for the programmer. The library then exposes the global address and local address to the application.

A program variable may have two addresses in the Limited Local Memory (LLM) architecture, depending on the memory in which it is located, and unlike in cache-based architectures, the program must access the variables by correct address. A conventional software cache implementation hides the address of the variable in the local memory and exposes only the global address of the variable. While this keeps programming very much like that in cache-based architectures, it requires address translation each time the variable is accessed, and results in high overhead.

The heap management illustrated in FIG. 4 exposes the local address of the variable to the application, so that the application can access it directly, and not perform the address translation every time. A function p2s(global address ga) brings the program variable at global address ga to the local memory, if it is not already there, and returns the local address, la of the variable. The counterpart functionality is encapsulated in the function s2p(local address la). In addition to these two new implemented functions, an application programming interface (API) for heap data management in certain embodiments may redefine two existing functions. If there is enough memory space in the heap region defined in the local store, the malloc function returns a pointer to it, otherwise it evicts older heap variable(s) to global memory to make sufficient space for this heap variable, and returns a pointer to it. The malloc function may allocate space on the local memory and returns the global memory address of the allocated heap variable. This is so that the global address may be used to access the heap variables, including when writing them in data structures, e.g., linked list. Arbitrary sized linked lists cannot work with local addresses of heap variables. A free function may also receive and operate on the global address of the variable.

The heap data and the heap management table in the main memory may be managed dynamically, which may allow support for nearly unlimited heap memory. In one embodiment, a separate memory management thread may be running on the main core. This separate thread may be a part of the library and the programmer does not have to explicitly code it. The unit of data transfer between the local memory and the global memory is called the granularity of management. Heap data may be managed at various granularities from word-level to the whole heap space allocated in the local memory.

Considering the SPU code in FIG. 2, the program allocates a student data structure, and then accesses one field (student.id). When the program accesses any part of a allocated data structure, if the whole data structure is brought into the local memory, then the heap management is done at programmer defined granularity. If only an exact field, such as the integer field of student.id is brought into the local memory, then the heap management is being done at word level of granularity. A finer granularity of heap management may be beneficial, if the allocated data structures are large, and only a small part of them are used in the algorithm. Finally, heap management may be performed at a coarse granularity by grouping the allocated objects in a block, and if a part of any of them is accessed, then a whole block of them are brought into the local memory. This may be effective when the allocated objects are small. One advantage of a software-implemented heap management is that it can be tuned to the application demands, rather than block size being fixed for a given processor implementation as in traditional cache architectures.

To assist in managing a nearly unlimited heap data in a limited space on the local memory, the library may keep a mapping of global to local addresses. This data structure is called the heap management table. The local memory space for heap management S may be divided into a constant space required for heap data H and a constant space required for heap management table, T, such that S=H+T. A malloc may add an entry to this table, and a free may result in the removal of an entry in the heap management table. The table may be accessed at every call to p2s and s2p functions. A part of this table may be stored in the local memory. All the sizes, S, H, and T are fixed at compile time. When an entry is added, the heap management may check if there is place to write the new entry. If yes, then the new entry may be written to the table. Otherwise, the new entry may be written to the table after making space for a new entry by evicting some of the older entries to the main memory. The number of entries evicted at a time is the granularity of management, and the heap table management may be performed at several granularities, from a single element to the entire table size. In one embodiment, the heap management table may be managed at the whole table size granularity. Thus, the whole table may be evicted and a full table brought back into the local memory.

The heap data structures and the heap management table may be implemented in the main global memory using dynamic data structures. The malloc function may be mapped to insert operation in the dynamic data structure on the main core through communication between the local and the main thread, which can interpret messages from the local thread and translate them as inserts in the data structure in the main thread. In a many-core processor this may be achieved through another thread on the main processor and a mailbox-based communication between the execution cores and the main core. This communication may be in addition to the actual heap data that has to be transferred between the local and the main core.

In embedded systems, it may be possible to define an upper bound on the heap memory. Thus, overhead in managing the table may be reduced. If a maximum heap size (e.g., assuming no free's) is known at compile time, profiling may be used to keep this size. Then, the heap data structure and heap management table may be declared as static data structures and all heap variables may be allocated contiguously in the pre-defined space. When heap data is needed, the address may be resolved in the execution core to allow a direct memory access (DMA) to transfer the data between the local and the global memory. In this embodiment, no extra thread is executed in the main core. Furthermore, in certain embodiments, the whole heap management table may be housed in the local memory, which may result in improved performance.

For certain embedded applications, where the maximum heap size of the application or thread is available by profiling, the application runtime may be improved by allocating sufficient space in the global memory such that dynamic allocation of memory in the PPE is reduced or eliminated. This may further improve performance, because dynamic memory allocation in the PPE requires communication between the SPE and the PPE through a mailbox which may be slower than a direct memory access. Performance may also be improved by increasing the heap space in the local store to as high as possible and/or increasing the granularity also helps.

FIG. 6 is a graph illustrating heap size capabilities with and without heap management according to embodiments of the disclosure. FIG. 6 is generated by executing the rbTree benchmark without heap management and with heap management according to one embodiment of the disclosure. The red black tree is a binary search benchmark with each node in the tree data structure using 24 bytes. Each node is dynamically allocated and thus uses heap. In the benchmark, the code and global data occupy 15312 bytes in total. The rest of the space is shared between the heap and the stack data. Without any heap management, only $n_0$=6800 nodes (almost 160 KB) may be allocated. Exceeding this number of nodes causes the program to crash. The limitation is illustrated by line 602 of FIG. 6.

Performance with heap management as disclosed in this application is illustrated by line 604 of FIG. 6. As shown, the technique does not have a restriction on the heap size of the application, up to at least 100,000 nodes. Both the heap management table, and memory allocation in the global memory may be dynamically managed. In some cases, the runtime increases with the management scheme, because DMA is performed for the management of the heap data and heap management table.

As the number of cores in a processor is scaled up, scaling the memory architecture becomes a bottleneck. Limited local memory (LLM) architectures are a scalable memory architecture platform that is now popular in embedded processors. Such processors feature a software controlled local memory in each core. Automated heap memory management may be achieved by providing an simple-to-use programming interface, which consists of a redefinition of the malloc and free commands, and introducing two new functions, p2s and s2p, which are called in an application before and after every heap pointer access. The active heap management disclosed above may be executed on, for example, the SONY PLAYSTATION 3 and the IBM CELL processor. The heap management may support any amount of heap data, is intuitive and easy to use, and scales well with number of cores. In certain embodiments, a single memory management thread on the PPE may service the needs of all the SPE memory requests.

According to one embodiment, the number of table entries may be the same as the number of heap objects in the local store of SPE. For example, for a given total space for heap variables, the space may be partitioned to heap management table and heap variables to optimize the total DMA transfer between global memory and local store. According to another embodiment, the calls to p2s and s2p functions before/after each heap variable access may be reduced by predicting if the variable will need frequent access again at a later stage. This can be improved further by doing a flow analysis using the control flow graph. According to yet another embodiment, prefetching and double buffering may be used to reduce the runtime needed for the DMA.

Heap data may also be managed through modifications to a compiler. An automated and low overhead heap data management scheme may be implemented in an application through a compiler and a runtime library. The modified compiler may reduce library call insertions in the application. The runtime library may include heap management functions such as, for example, _malloc(size), _free(global addr), and g2l(global addr). The _malloc function may allocate space in global memory and return a global address to that space. A global address may be returned when the mapping relation between global address and local address is many-to-one. A _free function may receive a global address and deallocate space in the global memory corresponding to the global address. A g2l(global addr) function may retrieve a global _addr and looks it up in a heap management data structure. If the heap object pointed to by global_addr is not in the local memory, the g2l function may fetch it from the specified global_addr and place it in the data structure. Either case may return the local address in our data structure.

Figure 7:
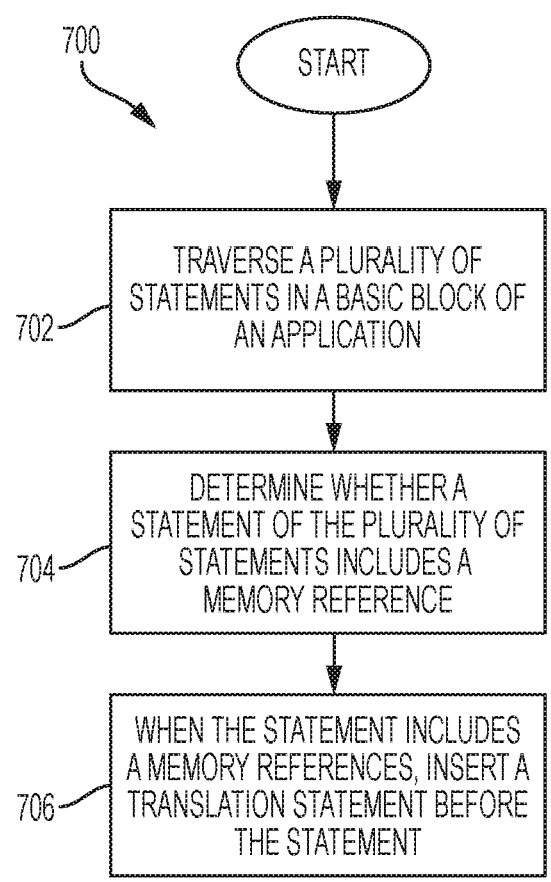
FIG. 7 is a flow chart illustrating a method of heap data management in a compiler according to one embodiment of the disclosure.

FIG. 7 is a flow chart illustrating a method of heap data management in a compiler according to one embodiment of the disclosure. A method 700 begins at block 702 with traversing a plurality of statements in a basic block of an application by a compiler. At block 704, it is determined whether any statement of the plurality of statements includes a memory reference. When a statement includes a memory reference, a translation statement is inserted at block 706 before the statement identified at block 704 during compilation of the application.

According to one embodiment, extensions to the compiler may be implemented in GCC 4.1.1. For example, the compiler support may be implemented as a pass at the GIMPLE level, because GIMPLE is a language independent IR and contains high level information, e.g., pointer information. GIMPLE is a three-address IR with tuples of no more than 3 operands (with some exceptions like function calls), and obtained by removing language specific construct from AST (Abstract Syntax Tree).

Additional details regarding an algorithm for a compiler to insert statements for heap data management is shown in FIG. 8. FIG. 8 is source code illustrating insertion of heap data management statements during compilation of a program according to one embodiment of the disclosure. As shown in the embodiment of FIG. 8, a pass traverses statements in basic blocks of the application. When a memory reference is detected at line 7, a analyzeStmt function may insert a g2l function call. In an embodiment using GIMPLE, modification expressions may be represented in the form "a=b" and only one of them may be a reference, thus the analyzeStmt function may check if either one is a reference. If a reference is found, the pass creates a statement "T=_g2l(ptr)," where ptr may be l or r, and inserts the statement into the statement list before stmt.

In one embodiment, when the g2l function receives a parameter, the function may check whether the parameter is in local address space or global address space. If the parameter is a local address, such as a stack pointer, the function may return the original address. In some embodiments, the heap object may contain a function pointer as an element. For example, with a statement such as "H→func=testFunc," the compiler may use "H" as the parameter for the _g2l function instead of "H→func," where func is a function pointer in the heap object H.

In one embodiment, the compiler may be designed to handle multi-level points. Multi-level pointers, such as in C program code, may be broken down to operations containing only single-level pointers in GIMPLE IR, with artificial pointers generated by the compiler. In one example, a pointer read statement may be transformed to two statements in the GIMPLE IR, with an artificial pointer D.2348 generated by compiler. For example, a C statement of "val=**ptr" may be transformed to two GIMPLE IR statements of "D.2348=*ptr" and "val=*D.2348." By this transformation, resulting statements in the GIMPLE IR have single-level references. Although D.2348 and ptr are both pointers, macro TREE CODE of them return var_decl for D.2348 but indirect_ref for the latter one. Thus, in one embodiment, library calls may only be added for the ptr reference. After address translation, D.2348 receives a local address and no further function call is added. The TREE_CODE macro described above may be a functionality provided by GCC, which can tell what kind of node a particular tree is.

Figure 9:
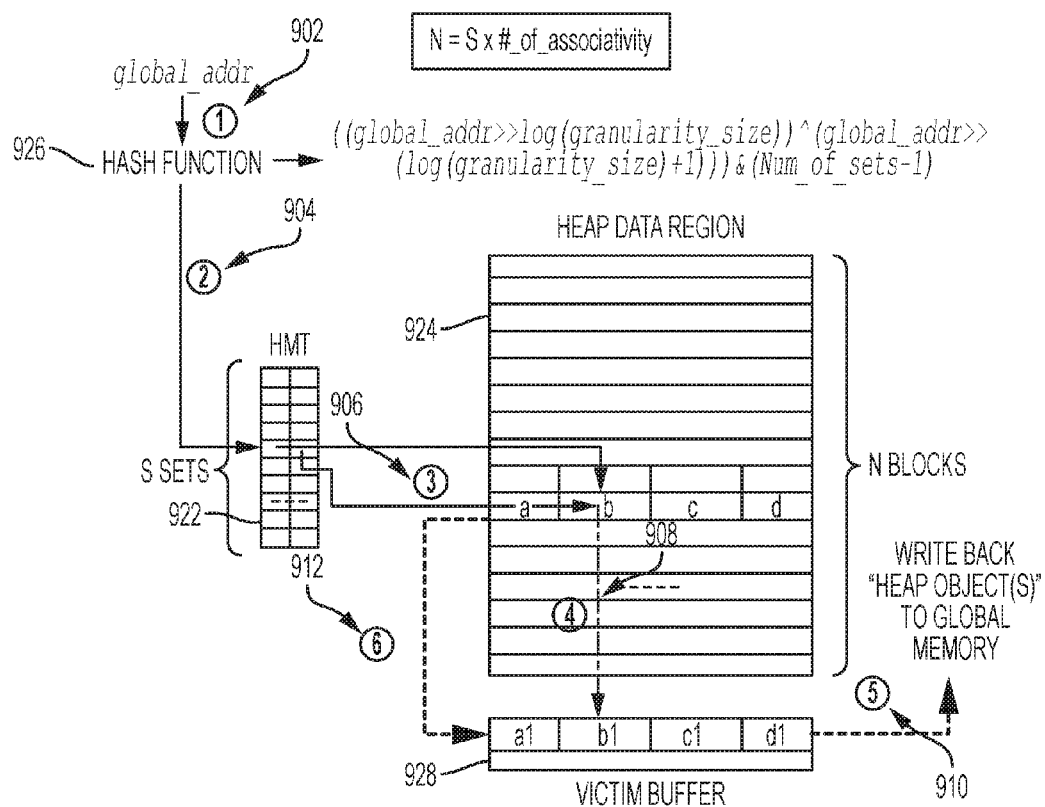
FIG. 9 is a block diagram illustrating a method of looking up heap objects in a two-way associative heap cache according to one embodiment of the disclosure.

FIG. 9 is a block diagram illustrating a method of looking up heap objects in a two-way associative heap cache according to one embodiment of the disclosure. A heap cache data structure in local memory may include S sets 922, N heap block 924, and a hash function 926. As a set may contain several blocks, N may be selected to be equal to the number of sets (S) multiplied the number of associativity (A). For example, in a 2-way associative heap cache, the number of blocks N may be equal to two times the number of sets (S). Other associative configurations, such as one-way, four-way, and eight-way, are possible. The hash function 926 may be seeded with a granularity_size and Num_of_sets by users before compilation. Each entry in the heap management table (HMT) may include a tag bit, a valid bit, a modified bit, and/or high bits of global addresses. In one embodiment, there may be a one-to-one static mapping between the entries in HMT and heap blocks. In this embodiment, the number of entries in HMT may be equal to the number of heap blocks (N), such that the size of the HMT is fixed.

The heap cache may also include a victim buffer 928 in the local memory. The victim buffer 928 may be used to relieve the thrashing of heap objects. For example, when a decision is made to swap a heap object out of the heap data region 924, the data will not immediately be moved to global memory, but instead to the victim buffer 928. When there is a heap miss in the heap cache, the heap object may be found in the victim buffer 928 reducing or eliminating the need for performing slow fetch operations from global memory.

An implementation of the g21 function may be described with reference to the heap cache illustrated in FIG. 9. At step 902, the g21 function may receive a global_addr, and the hash function 926 may return a set index, i, corresponding to the requested global address, global_addr. At step 904, after finding the set number, i, the hash function 925 may access entry i in the HMT 922, where a tag status for the set i may be stored. Then, the valid tags in the selected set are compared to a tag in the global address, global_addr. At step 906, after comparison, the hash function 926 may determine in which block the accessing heap object is located. The hash function 926 may further determine an object offset of the accessing heap object in the cache block from global_addr. In the example illustrated in FIG. 9, the offset is 1. The g21 function may also check the status of the accessing object in the entry i of HMT 922 to determine whether it is in the location b. If there is a valid matching entry in HMT 922, then the request is a hit and the local address may be calculated by adding the object offset to the local address of the heap block that corresponds to the matching entry. If not, then the request is a miss and a miss handler is invoked at step 908. The miss handler may search the victim buffer 928, which may be fully associative, to determine whether the requested heap object is present. When the heap object hits, a local address in the block of the victim buffer 928 may be returned. Otherwise, an old heap block following a predefined replacement policy will be selected and evicted out from the heap data region 924 to the victim buffer 928 to free space for the requested data at step 910. Before overwriting a heap block in the victim buffer 928, the modified bit of the block may be checked. If this block is marked dirty, the block may be written back to the global memory. Otherwise, the location is overwritten at step 912. Then, the heap block that corresponds to the requested global address from global memory may be fetched and placed in the evicted location.

In one embodiment, the heap data structure management may be enhanced with Single Instruction Multiple Data (SIMD) operations. As described above, the runtime library for the heap cache may provide an N-way (e.g., N=1; 2; 4; 8) associative heap cache. The tag comparisons for the implementation of the N-way associative heap cache may be performed in parallel with the Single Instruction Multiple Data (SIMD) comparison instruction, when the execution core (e.g., SPE) supports Single Instruction Multiple Data (SIMD). In one embodiment, this SIMD programming may operates on vector data types that are 128-bits (16-bytes) long. In one example, an entry in the HMT 922 may be one word long and four comparisons for a set in four-way associative heap cache may be performed in one SIMD instruction. In another example, an eight-way associative heap cache may use two SIMD instructions for the eight comparisons of a set.

In one embodiment, a round robin replacement policy may be implemented in the heap cache. When it is determined that a new heap block is to be brought into the N-way associative heap cache, an old block may be chosen to be evicted from the heap cache in a round-robin fashion. In one example, a counter may be maintained for each set of the heap cache. The count indicates the index of the next block of the set to be evicted. When a heap block is evicted, the counter may be updated by adding one and then modulo the number of blocks in the set, such as four for a four-way associative heap cache.

Figure 10:
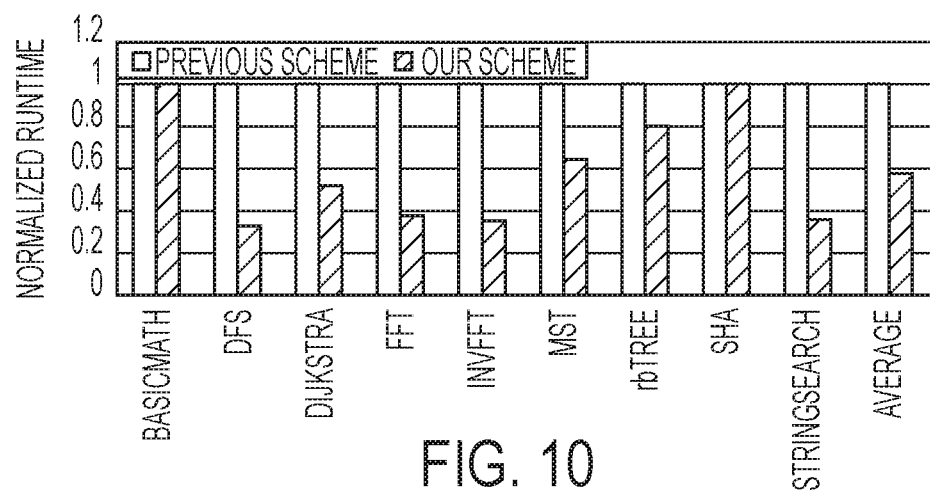
FIG. 10 is a graph illustrating runtime performance of application with and without compiler-inserted heap data management statements according to one embodiment of the disclosure.

Heap caches, such as when implemented as described in the embodiments above through a common run library and compiler modifications, provide an improvement in performance of the applications being compiled. FIG. 10 is a graph illustrating runtime performance of application with and without compiler-inserted heap data management statements according to one embodiment of the disclosure. The metrics shown in FIG. 10 are obtained using benchmarks with a 4-way associative heap region without victim buffer. An average improvement of 43% is obtained across all benchmarks.

Although specific many-core processors are described in the embodiments above, any suitable processor-based device may execute the heap management algorithm and other algorithms disclosed above, including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   traversing a plurality of statements in a basic block of an application;
   determining whether a statement of the plurality of statements includes a memory reference;
   when the statement includes a memory references, inserting a translation statement before the statement;
   determining whether the statement includes a reference to variable including a pointer to a pointer; and
   when the statement includes a pointer to a pointer, converting the variable to a first new variable and a second new variable, wherein the second new variable is a pointer to the first new variable.

2. The method of claim 1, in which the translation statement comprises a statement to look up a global address in a heap management data structure.

3. The method of claim 2, further comprising:
   determining whether a heap object pointed to by the global address is present in a limited local memory (LLM); and
   when the heap object is not present in the limited local memory (LLM), fetching the heap object from a global memory to the limited local memory (LLM).

4. The method of claim 3, further comprising returning a local address to the heap object for access to the heap object by the statement.

5. The method of claim 1, in which the step of converting the variable comprises converting a C statement to a GIMPLE IR statement.

6. A computer program product, comprising:
   a non-transitory computer readable medium comprising code to execute the steps comprising:
   traversing a plurality of statements in a basic block of an application;
   determining whether a statement of the plurality of statements includes a memory reference;
   when the statement includes a memory references, inserting a translation statement before the statement;
   determining whether the statement includes a reference to variable including a pointer to a pointer; and
   when the statement includes a pointer to a pointer, converting the variable to a first new variable and a second new variable, wherein the second new variable is a pointer to the first new variable.

7. The computer program product of claim 6, in which the translation statement comprises a statement to look up a global address in a heap management data structure.

8. The computer program product of claim 7, in which the medium further comprises code to execute the steps comprising:
   determining whether a heap object pointed to by the global address is present in a limited local memory (LLM); and
   when the heap object is not present in the limited local memory (LLM), fetching the heap object from a global memory to the limited local memory (LLM).

9. The computer program product of claim 8, in which the medium further comprises code to execute the step of returning a local address to the heap object for access to the heap object by the statement.

10. An apparatus, comprising:
    a memory; and
    a processor coupled to the memory, wherein the processor is configured to execute the steps comprising:
    traversing a plurality of statements in a basic block of an application stored in the memory;
    determining whether a statement of the plurality of statements includes a memory reference;
    when the statement includes a memory references, inserting a translation statement before the statement;
    determining whether the statement includes a reference to variable including a pointer to a pointer; and
    when the statement includes a pointer to a pointer, converting the variable to a first new variable and a second new variable, wherein the second new variable is a pointer to the first new variable.

11. The apparatus of claim 10, in which the translation statement comprises a statement look up a global address in a heap management data structure.

12. The apparatus of claim 11, in which the processor is further configured to execute the steps comprising:
    determining whether a heap object pointed to by the global address is present in a limited local memory (LLM); and
    when the heap object is not present in the limited local memory (LLM), fetching the heap object from a global memory to the limited local memory (LLM).

13. The apparatus of claim 12, in which the processor is further configured to execute the step of returning a local address to the heap object for access to the heap object by the statement.

* * * * *